United States Patent … US 7,860,093 B2
Shepherd et al. (45) Date of Patent: Dec. 28, 2010

(54) FAST MULTICAST CONVERGENCE AT SECONDARY DESIGNATED ROUTER OR DESIGNATED FORWARDER

(75) Inventors: Gregory Shepherd, Eugene, OR (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 12/004,970

(22) Filed: Dec. 24, 2007

(65) Prior Publication Data

US 2009/0161670 A1  Jun. 25, 2009

(51) Int. Cl.
 *H04L 12/28* (2006.01)
(52) U.S. Cl. ...................................... 370/390; 370/432
(58) Field of Classification Search ....................... None
 See application file for complete search history.

(56) References Cited

U.S. PATENT DOCUMENTS

| | | | | |
|---|---|---|---|---|
| 6,707,796 | B1 * | 3/2004 | Li | 370/254 |
| 2002/0114302 | A1 * | 8/2002 | McDonald et al. | 370/338 |
| 2002/0186652 | A1 * | 12/2002 | Popovich | 370/218 |
| 2003/0088696 | A1 * | 5/2003 | McCanne | 709/238 |
| 2003/0193958 | A1 * | 10/2003 | Narayanan | 370/400 |
| 2006/0050643 | A1 * | 3/2006 | Yoshimoto et al. | 370/241 |
| 2007/0147374 | A1 * | 6/2007 | Lee et al. | 370/390 |
| 2007/0239879 | A1 * | 10/2007 | Serbest et al. | 709/230 |
| 2008/0205395 | A1 * | 8/2008 | Boddapati et al. | 370/390 |

OTHER PUBLICATIONS

Fenner et al., "Protocol Independent Multicast—Sparse Mode (PIM-SM): Protocol Specification (Revised)", IETF RFC 4601, Aug. 2006.
Handley et al., Bi-directional Protocol Independent Multicast (BIDIR-PIM), IETF draft-ietf-pim-bidir-09.txt, Feb. 2007.

* cited by examiner

*Primary Examiner*—Chirag G Shah
*Assistant Examiner*—Otis L Thompson, Jr.
(74) *Attorney, Agent, or Firm*—Cindy Kaplan

(57) ABSTRACT

In one embodiment, a method includes receiving at a network device designated as a secondary designated router or forwarder, an indication that a receiver wants to join a multicast group, transmitting a multicast join message in response to the received indication, and receiving multicast data from a source at the network device. If a primary designated router or forwarder is operating to forward the multicast data from the source to the receiver, the received multicast data is dropped. If a failure occurs at the primary designated router or forwarder, the received multicast data is forwarded to the receiver. An apparatus for fast multicast convergence at a secondary designated router or forwarder is also disclosed.

17 Claims, 5 Drawing Sheets

FAST MULTICAST CONVERGENCE AT SECONDARY DESIGNATED ROUTER OR DESIGNATED FORWARDER

BACKGROUND OF THE INVENTION

The present disclosure relates generally to multicast network convergence following a failure at a designated router or designated forwarder.

Traditional Internet Protocol (IP) communication allows a host to send packets to a single host (unicast transmission) or to all hosts (broadcast transmission). To support a demand to provide applications that involve high data rate transmission to multiple hosts, a third routing technique has evolved, multicast routing. Multicast routing is used to send data communications to multiple receivers on a network utilizing a multicast address. Multicast routing protocols have been developed to conserve bandwidth by minimizing duplication of packets.

One protocol that supports IP multicast is Protocol Independent Multicast (PIM). A multicast distribution tree is created to ensure distribution to intended receivers while limiting distribution so that network segments that are not in the path between a source and receivers are not burdened with unnecessary traffic. The distribution tree for each multicast group is rooted at a source or a multicast router called the Rendezvous Point (RP). A designated router (DR) sends control messages on behalf of directly connected sources and directly connected receivers for ASM (Any Source Multicast) groups. For bidirectional groups, a designated forwarder (DF) sends control messages on behalf of a directly connected receiver and forwards data packets on behalf of a directly connected source.

On last-hop multicast networks served by redundant routers, an election process for the designated router or designated forwarder (DR/DF) selects one router to send join messages upstream toward the source or RP. If the elected DR/DF fails, a new DR/DF needs to be elected. The new DR/DF then needs to send PIM join messages to build a multicast distribution tree and attract traffic to be forwarded onto the receiver network. This results in multicast network convergence times that increase significantly with increased multicast state in the network. Also, the time it takes for the elected DR/DF to be detected as down, affects convergence time to rejoin on the distribution tree.

DESCRIPTION OF EXAMPLE EMBODIMENTS

Overview

Figure 1:
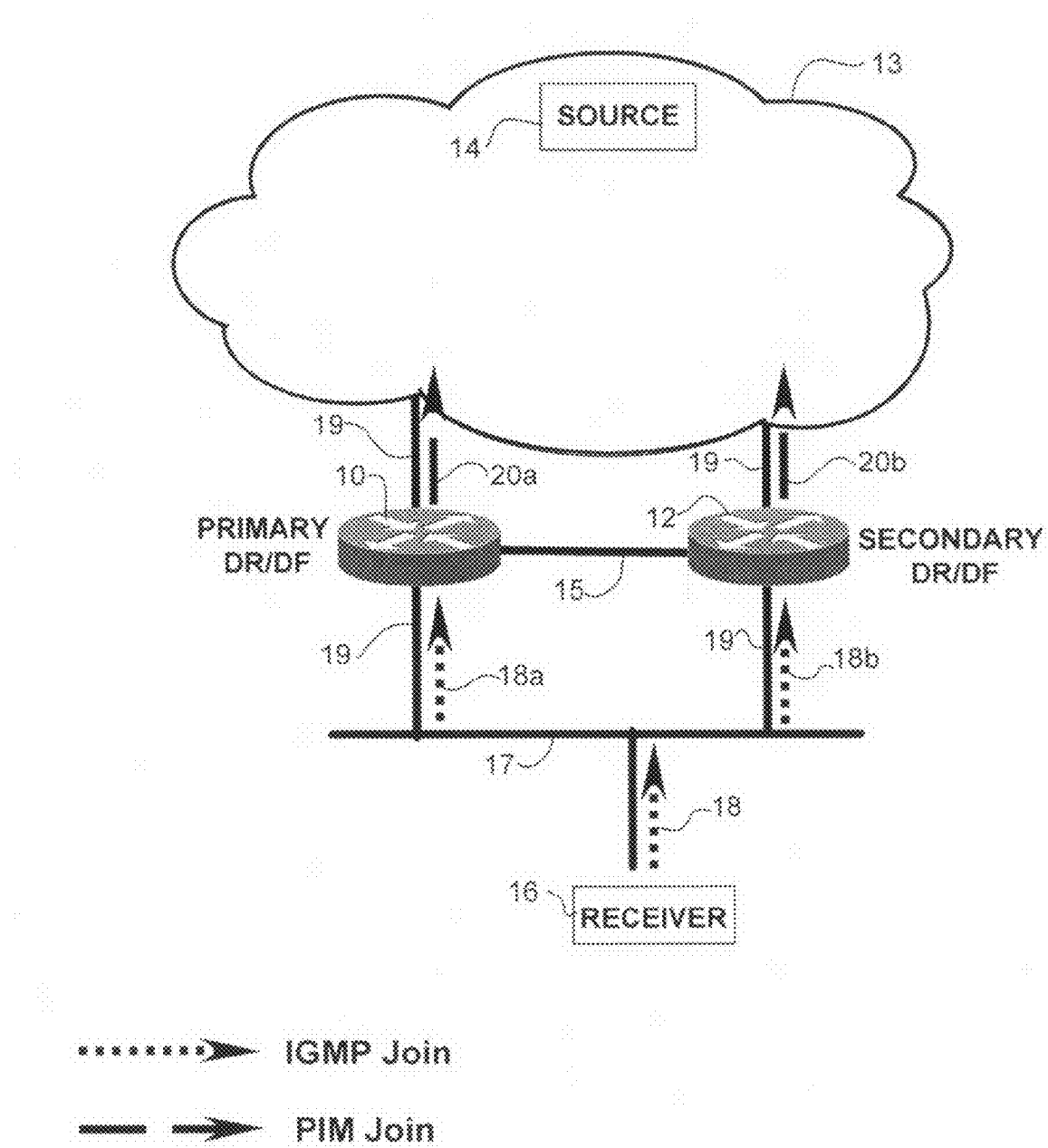
FIG. 1 illustrates an example of a network comprising a primary DR/DF and a secondary DR/DF, both sending PIM join messages on behalf of a receiver.

A method and apparatus for fast multicast convergence at a secondary designated router or forwarder are disclosed.

In one embodiment, a method generally comprises receiving at a network device designated as a secondary designated router or forwarder, an indication that a receiver wants to join a multicast group, transmitting a multicast join message in response to the received indication, and receiving multicast data from a source at the network device. If a primary designated router or forwarder is operating to forward the multicast data from the source to the receiver, the received multicast data is dropped. If a failure occurs at the primary designated router or forwarder, the received multicast data is forwarded to the receiver.

In one embodiment, the apparatus generally comprises a processor configured to receive notification that the apparatus is designated as a secondary designated router or forwarder, receive an indication that a receiver wants to join a multicast group, transmit a multicast join message in response to said received indication, receive multicast data from a source, drop the multicast data if a primary designated router or forwarder is operating to forward the multicast data from the source to the receiver, and forward the multicast data if a failure occurs at said primary designated router or forwarder. The apparatus further includes memory for storing a list identifying receivers of the multicast data for the multicast group and wherein the receiver is identified in said list only if a failure occurs at said primary designated router or forwarder.

Example Embodiments

The following description is presented to enable one of ordinary skill in the art to make and use the invention. Descriptions of specific embodiments and applications are provided only as examples, and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The embodiments described herein operate in the context of a data communication network including multiple network elements. Some of the elements in a network that employs the embodiments may be routers, switches, gateways, or other network devices. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate applications software. In one embodiment, the network device is implemented on a general purpose network host machine as described below with respect to FIG. 5.

A network implementing the embodiments described herein is configured to use IP multicast, which simultaneously delivers a single stream of information to numerous recipients. A brief discussion of multicast routing is provided to help introduce concepts used in the embodiments described herein.

Multicast operation is based on the concept of a group. A multicast group is an arbitrary group of receivers that expresses an interest in receiving a particular data stream. An IP multicast address, or a portion thereof, specifies a particular group. Hosts that are interested in receiving data flowing to a particular group join the group using Internet Group Management Protocol (IGMP) or Multicast Listener Discovery (MLD), for example.

Multicast-capable routers create distribution trees that control the path that IP multicast traffic takes through the network in order to deliver traffic to all receivers. Members of multicast groups can join or leave at any time; therefore the distribution trees are dynamically updated.

In one embodiment, Protocol Independent Multicast (PIM) is used to dynamically create a multicast distribution tree to ensure distribution to intended receivers while limiting distribution so that network segments that are not in the path between a source and receivers are not burdened with unnecessary traffic. There are a variety of PIM forwarding modes including Bi-Directional PIM (Bidir-PIM), PIM Sparse Mode (PIM-SM, also known as ASM (Any Source Multicast)), PIM Source-Specific Multicast (SSM), and PIM Dense Mode (PIM-DM), which may be accommodated by embodiments described herein. The following describes use of a designated router (DR) in PIM-SM and a designated forwarder (DF) in bidir-PIM. It is to be understood that other modes or multicast protocols may also be used without departing from the scope of the invention.

In PIM-SM, a designated router of the source becomes aware of the source's transmissions and encapsulates source traffic for forwarding to a Rendezvous Point (RP) (root in a shared tree). Last-hop routers (i.e., routers on the shared tree that are directly connected to one or more receivers) learn about a particular source when they receive data packets on the shared tree from that source through the RP. The last-hop routers then send PIM join messages toward the source. When a receiver wants to join a shared tree, it sends an IGMP message to its direct neighbors. The designated router among these direct neighbors reacts by noting the receiver's interest in receiving multicast packets flowing down this shared tree and by sending a join message towards the RP if needed.

The shared trees that are created in PIM-SM are unidirectional. A source tree must be created to bring the datastream to the RP and then it can be forwarded down the branches to the receivers. By contrast, in bidir-PIM, traffic is routed only along a bi-directional shared tree that is rooted at the RP. Data from the source can flow up the shared tree towards the RP and then down other branches of the shared tree to the receivers. In bidir-PIM, a designated forwarder is responsible for forwarding multicast packets received on the network upstream to the RP.

Referring now to the drawings, and first to FIG. 1, a network in which embodiments described herein may be implemented is shown. The network includes PIM enabled routers 10, 12 coupled together via communication link 15. The network enables multicast data communication between a source 14 and receiver 16 on local area network (LAN) 17. The source 14 is located within a network 13, which contains any number of network elements and may include a RP (for PIM-SM and bidir-PIM) and a designated router for the source (for PIM-SM) (not shown). The multicast source 14 sends packets to a multicast group. The receiver 16 is capable of subscribing to the multicast group. Routers 10, 12 are in communication with the source 14 and receiver 16 through a number of communication links 19. It is to be understood that for simplification only a limited number of network elements are shown in FIG. 1, and that the embodiments described herein may be used in different types of networks having any number of network elements or arrangement of the networks.

On last-hop multicast networks served by redundant routers (nodes 10 and 12 in FIG. 1), an election process selects a primary router as the primary designated router (if operating in PIM-SM, for example) or designated forwarder (if operating in bidir-PIM). The election process is also used to select a secondary (backup) designated router or designated forwarder. Details of the election process are described below. For simplification, the nodes that may be designated routers or designated forwarders are referred to as DR/DF. In the network shown in FIG. 1, node 10 has been selected as the primary DR/DF and node 12 has been selected as the secondary DR/DF for receiver 16.

The secondary DR/DF 12 is configured to receive a join message (e.g., IGMP or MLD message), generate a (S, G) or (*, G) state, send a PIM join message upstream toward the source (for a source tree) or RP (for a shared tree) in generally the same manner as the primary DR/DF 10. However, the secondary DR/DF 12 does not enter the receiver 16 (interface for LAN 17) in its outgoing interface (OIF) list and therefore does not forward traffic received from the source 14, as does the primary DR/DF 10. If a failure occurs at the primary DR/DF 10, the secondary DR/DF 12 is ready to accept and forward traffic to the receiver 16 as soon as it adds the receiver 16 to its OIF list. This allows for fast convergence at the secondary DR/DF 12 as compared to conventional systems which must elect a new DR/DF following failure at the primary DR/DF, send PIM join messages, build a tree, and attract traffic, before it can start to forward traffic to the receiver.

FIG. 1 illustrates operation of the primary and secondary DR/DFs 10, 12 upon receiving an indication that the receiver 16 wants to join a multicast group. Both the primary and secondary DR/DFs 10, 12 receive a join message (e.g., IGMP or MLD). FIG. 1 illustrates an IGMP Join transmitted from receiver 16 to the primary and secondary DR/DFs 10, 12 at arrows 18, 18a, and 18b. Both the primary DR/DF 10 and secondary DR/DF 12 listen to traffic and install the IGMP/MLD state for the receiver 16 upon receiving the join message. In response to receiving the join message from receiver 16, the primary DR/DF 10 and secondary DR/DF 12 each transmit a PIM join message (arrows 20a, 20b in FIG. 1) upstream toward the RP (or source) on behalf of the IGMP/MLD state and build a multicast distribution tree.

Figure 2:
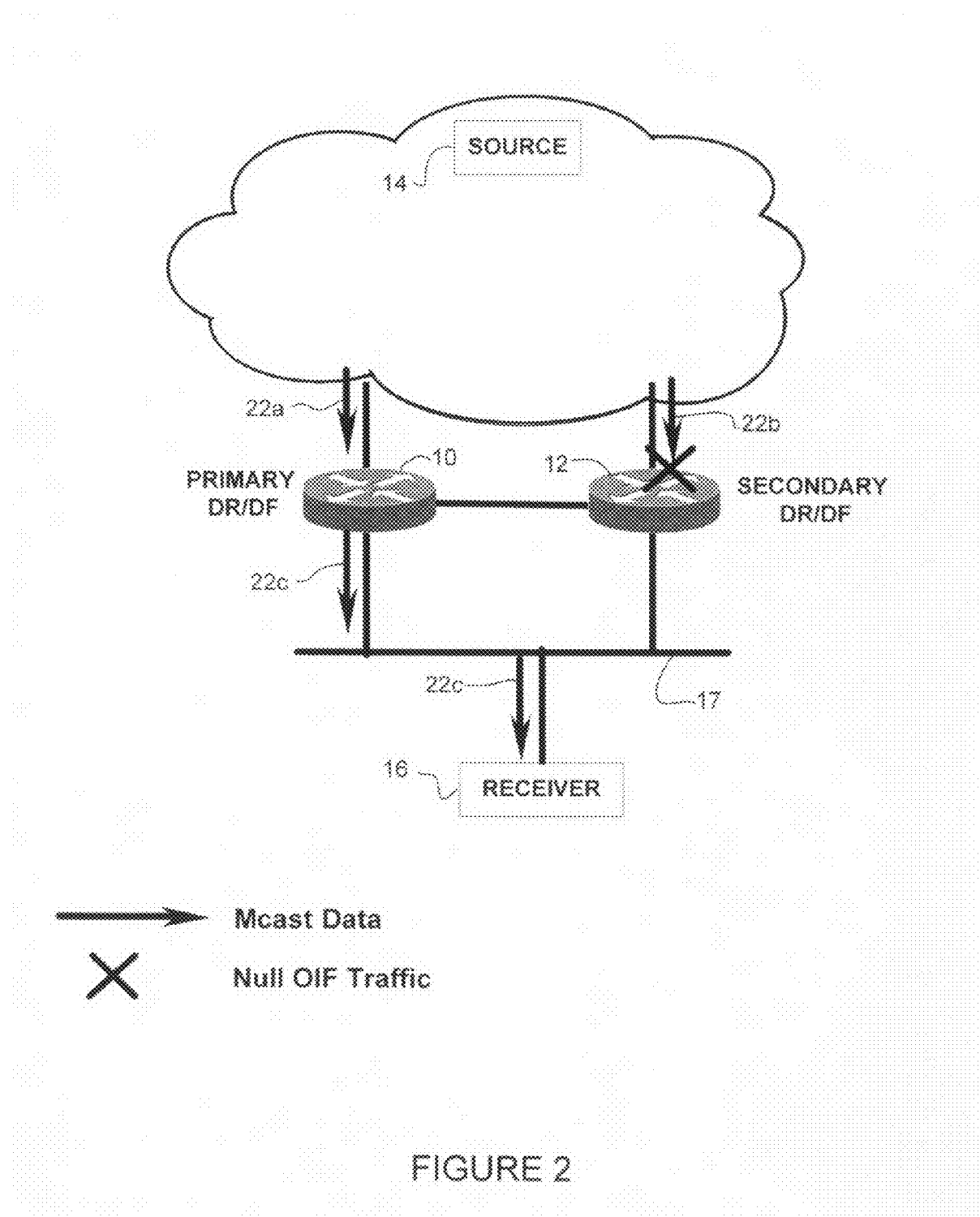
FIG. 2 illustrates the primary DR/DF of the network of FIG. 1 forwarding multicast data traffic to a receiver.

FIG. 2 illustrates the transfer of multicast data from the source 14 to the primary DR/DF 10 and secondary DR/DF 12 at arrows 22a and 22b, respectively. Both the primary and secondary DR/DF routers 10, 12 attract the multicast data traffic but only the primary DR/DF 10 forwards the traffic onto the LAN 17 (arrows 22c). This is because only the router elected as the primary DR/DF populates the OIF list upon receiving an IGMP/MLD join message. The secondary DR/DF 12 drops the traffic on ingress due to the null OIF list of PIM state at the router.

Figure 3:
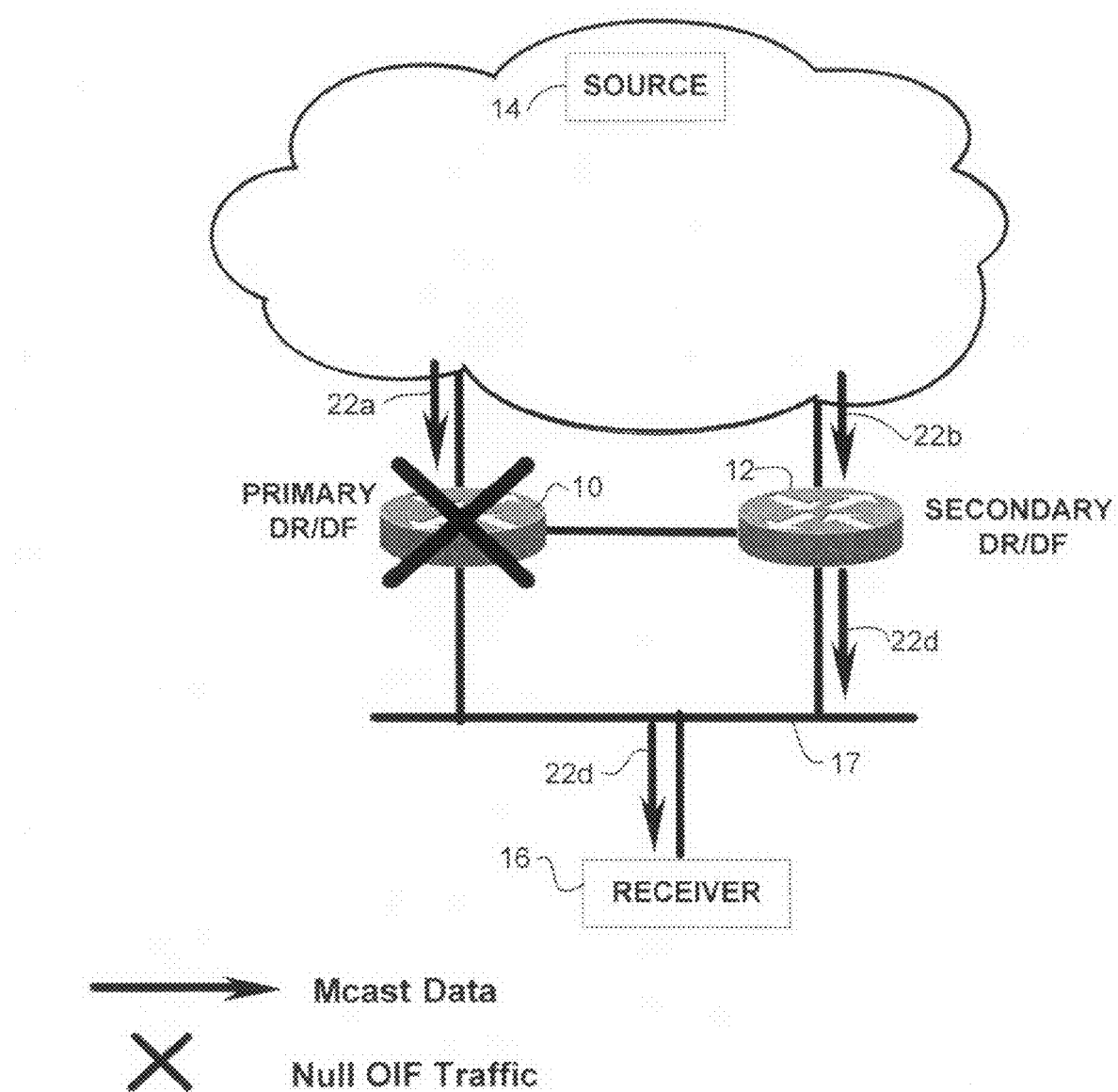
FIG. 3 illustrates a failure at the primary DR/DF and forwarding of the multicast data traffic from the secondary DR/DF to the receiver.

FIG. 3 illustrates operation following a failure at the primary DR/DF 10. When the primary DR/DF 10 fails, the secondary DR/DF adds the receiver 16 to the OIF list and begins accepting the multicast traffic from the source 14 and forwarding it to the receiver (arrows 22d). The secondary DR/DF 12 can therefore take over as the primary DR/DF for the receiver 16 and begin forwarding traffic without having to send any new PIM join messages or build a distribution tree. Multicast network convergence times are thus not dependent upon PIM join send, receive, or processing times and are thereby considerably improved. Also, dependence of convergence time on multicast state is removed.

The election process for a designated router is described below, followed by a description of the election process for a designated forwarder.

In one embodiment, the election process for the DR is performed in accordance with RFC 4601 ("Protocol Independent Multicast—Sparse Mode (PIM-SM): Protocol Specification (Revised)", B. Fenner et al., August 2006), which is incorporated herein by reference in its entirety. In this process, DR election is performed using Hello messages. PIM Hello messages are sent periodically (e.g., every 30 seconds) on each PIM-enabled interface. When a PIM Hello message is received on an interface, information about the sending neighbor is recorded. The information may include, for example, the interface on which the Hello message arrived, IP address that the PIM neighbor used as the source address of the Hello message, and a DR priority number of the router sending the Hello message. DR priorities on the interfaces are compared and a higher priority DR is selected. If the DR priorities match or any of the routers do not support the DR priority option, the router with the highest IP address is selected as the DR. A network administrator may give preference to a particular router in the DR election process by giving it a numerically larger DR priority.

In one embodiment, DF election is performed in accordance with draft-ietf-pim-bidir-09.txt ("Bi-directional Protocol Independent Multicast (BIDIR-PIM)", M. Handley et al., Feb. 22, 2007), which is incorporated herein by reference in its entirety. The DF election chooses the best router on a link. The winner of the election process is the router with the best unicast routing metric (as reported by the MRIB (multicast routing information base)) to reach the RP. The election process may be performed when information on a new RP becomes available. An update to the election process may be performed when there is a change in unicast routing metric to reach the RP for any of the routers on the link, the interface which the RP is reachable (RPF (Reverse Path Forwarding) interface) changes to an interface for which the router was previously the DF, or a new PIM neighbor starts up on a link that participates in the election and is to be informed of the outcome.

It is to be understood that the DR/DF election processes described above are only examples. The DR/DF may be selected based on different rules. For example, IP addresses, routing speeds, capacities, or the physical locations of the routers can be taken into account in selection of the DR/DF.

In addition to using the above described election processes to select a primary DR/DF, the election process is also used to select a secondary DR/DF. The election of the secondary DR/DF is preferably performed at the same time as the primary DR/DF election and using the same election process. For example, the router with the second best priority (or second highest IP address) may be selected as the secondary DR. The router with the second best unicast routing metric may be selected as the secondary DF.

Figure 4:
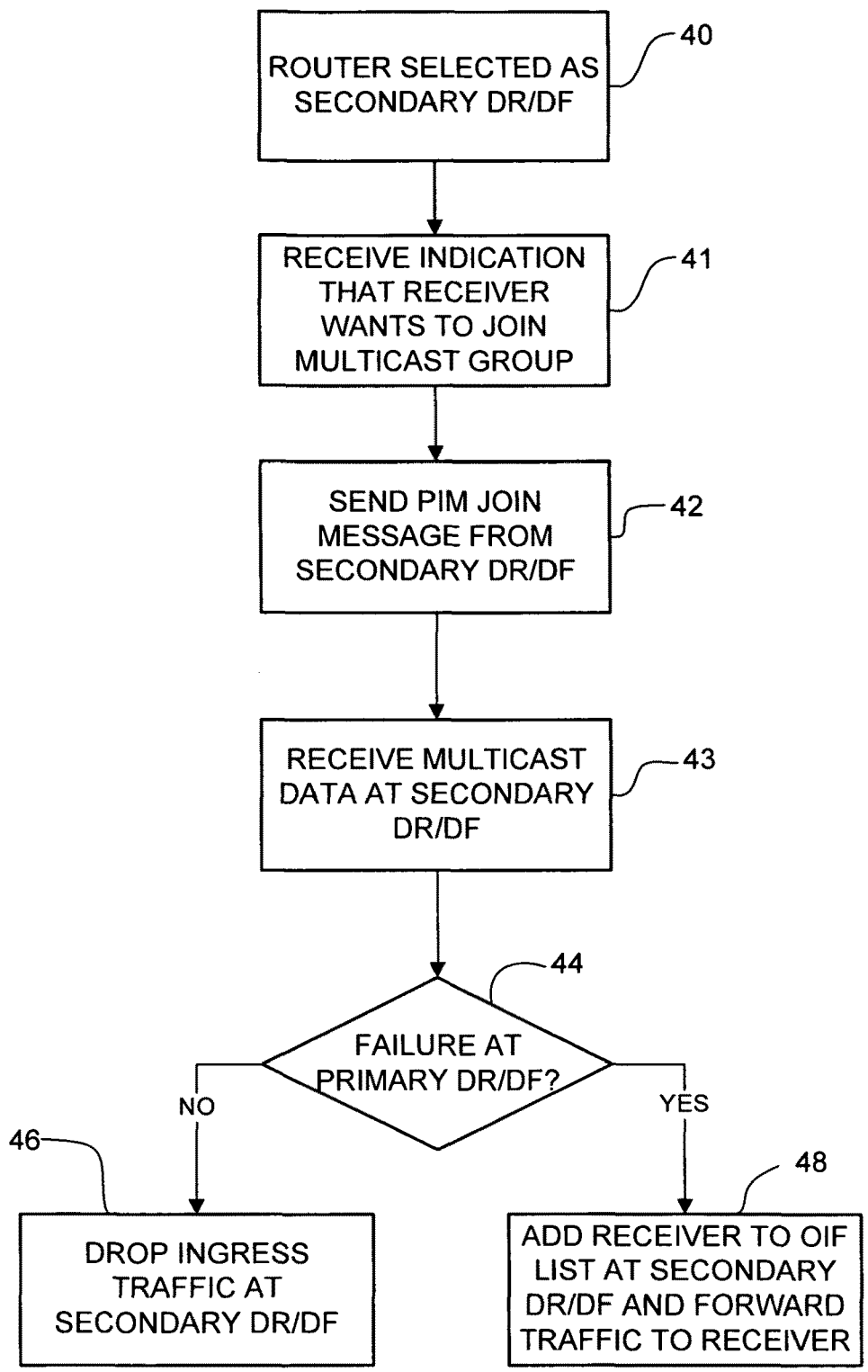
FIG. 4 is a flowchart illustrating a process for fast multicast convergence at a secondary DR/DF.

FIG. 4 is a flowchart illustrating a process for fast multicast network convergence at a secondary DR/DF, in accordance with one embodiment. At step 40, a router is designated as the secondary DR/DF. As described above, the election process for the secondary DR/DF 12 is preferably performed along with the election process for the primary DR/DF 10. At step 41, the secondary DR/DF 12 receives an indication from the receiver 16 that the receiver wants to join a multicast group. The receiver 16 may send, for example, an IGMP or MLD message (membership report) to the secondary DR/DF 12 (FIG. 1). In response to the received message, the secondary DR/DF 12 generates and transmits a PIM join message (step 42). The PIM join message is multicast to all nodes, including the RP (or source). The secondary DR/DF 12 also updates its (*, G) state (or creates a state if it does not already exist). When a multicast data packet is received at the secondary DR/DF 12, the OIF list is checked. The OIF list includes all the interfaces for which the router has been elected primary DR/DF and has received a join message on. The secondary DR/DF 12 does not add the receiver 16 to its OIF list unless there is a failure at the primary DR/DF 10. If the primary DR/DF 10 is operating to forward multicast data from the source 14 to the receiver 16, the OIF list at the secondary DR/DF will not include the receiver 16. Therefore, multicast data traffic received at the secondary DR/DF 12 from source 14 and destined for the receiver 16 is dropped if there is no failure at the primary DR/DF 10 (steps 44 and 46) (FIGS. 2 and 4). If a failure occurs at the primary DR/DF 10, the receiver 16 (e.g., interface to LAN 17) is added to the OIF list at the secondary DR/DF 12 (new primary DR/DF) and traffic received at the new primary DR/DF 12 is forwarded to the receiver 16 (steps 44 and 48) (FIGS. 3 and 4). The secondary DR/DF 12 may receive a notification of failure of the primary DR/DF 10 from a node on the network or may identify a failure when the primary DR/DF 10 fails to respond to a Hello message transmitted from the secondary DR/DF 12 to the primary DR/DF 10, for example.

In one embodiment, the DR/DF may send Hello messages more frequently than the other PIM neighbors (non-DR/DF neighbors) on the last hop LAN, to detect the primary DR/DF failure. This allows the secondary DR/DF to identify a failure at the primary DR/DF faster, without the expense of all nodes sending Hello messages at a faster rate. For example, the primary and secondary DR/DFs can send Hello messages at a faster rate than the other PIM neighbors on the network and include a Holdtime of three times the Hello message interval (e.g., one and three seconds, respectively).

In another embodiment, bidirectional forwarding detection (BFD) may be used to detect a fault at the primary DR/DF.

Figure 5:
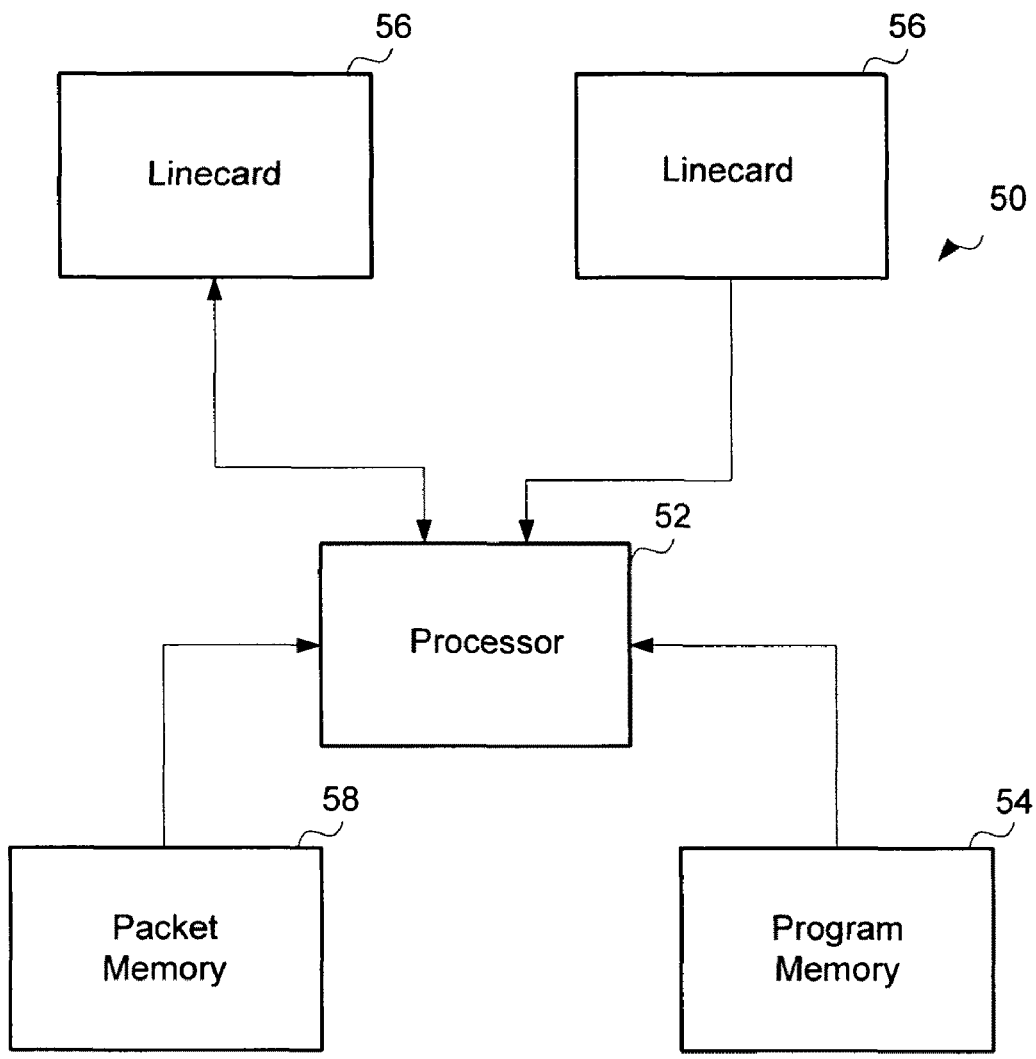
FIG. 5 depicts an example of a network device that may be used to implement embodiments described herein.

FIG. 5 depicts a network device 50 that may be used to implement the method and system described herein. In one embodiment, network device 50 is a programmable machine that may be implemented in hardware, software, or any combination thereof. A processor 52 executes code stored in a program memory 54. Program memory 54 is one example of a computer-readable medium. Program memory 54 can be a volatile memory. Another form of computer-readable medium storing the same codes may be some type of non-volatile storage such as floppy disks, CD-ROMs, DVD-ROMs, hard disks, flash memory, etc.

Network device 50 interfaces with physical media via a plurality of linecards 56. As packets are received, processed, and forwarded by network device 50, they may be stored in a packet memory 58. Packet transmission operations may occur partially or completely within one of the linecards 56. To implement functionality according to the present invention, linecards 56 may incorporate processing and memory resources similar to those discussed above in connection with the network device as a whole. Network device 50 implements all of the features provided by the present invention.

Network device 50 shown in FIG. 5 is only one example of a computer system suitable for use with the invention. Other devices and systems having different configurations of subsystems may also be utilized. Communication between computers within the network is made possible with the use of communication protocols, which govern how computers exchange information over a network.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method comprising:
   receiving at a network device designated as a secondary designated router or forwarder in a Protocol Independent Multicast (PIM) distribution tree, an indication that a receiver wants to join a multicast group;
   transmitting a PIM join message upstream towards a source or a rendezvous point in said distribution tree, in response to said received indication;
   receiving multicast data from a source at the network device;
   dropping the multicast data if a primary designated router or forwarder is operating to forward the multicast data from the source to the receiver; and
   adding the receiver to an outgoing interface list at the network device and forwarding the multicast data to the receiver only if a failure occurs at said primary designated router or forwarder;
   wherein said receiving an indication that a receiver wants to join a multicast group, said transmitting the PIM join message, and said receiving multicast data are performed when both said primary and secondary designated routers or forwarders are operating during normal operation at said primary designated router or forwarder.

2. The method of claim 1 further comprising generating state information for the multicast group in response to receiving said indication that the receiver wants to join the multicast group.

3. The method of claim 1 wherein receiving multicast data comprises receiving a multicast packet addressed to the multicast group, and dropping the multicast data comprises:
   checking said outgoing interface list; and
   preventing said received multicast packet from being forwarded via an interface leading towards the receiver if the interface is not identified in said outgoing interface list.

4. The method of claim 1 wherein transmitting a multicast join message comprises utilizing a Bidirectional Protocol Independent Multicast protocol and the network device is designated as said secondary designated forwarder in an election process selecting said primary designated forwarder.

5. The method of claim 1 wherein transmitting a multicast join message comprises utilizing a Protocol Independent Multicast Sparse Mode protocol and the network device is designated as said secondary designated router in an election process selecting said primary designated router.

6. The method of claim 1 wherein said received indication is an IGMP or MLD message.

7. The method of claim 1 further comprising transmitting a message from said secondary designated router or forwarder to said primary designated router or forwarder and identifying a failure at said primary designated router or forwarder if a response is not received.

8. The method of claim 1 wherein forwarding the multicast data to the receiver comprises checking said outgoing interface list and identifying an interface leading towards the receiver.

9. An apparatus comprising:
   a processor configured to receive notification that the apparatus is designated as a secondary designated router or forwarder in a Protocol Independent Multicast (PIM) distribution tree, receive an indication that a receiver wants to join a multicast group, transmit a PIM join message upstream towards a source or a rendezvous point in said distribution tree, in response to said received indication, receive multicast data from a source, drop the multicast data if a primary designated router or forwarder is operating to forward the multicast data from the source to the receiver, and add the receiver to an outgoing interface list at the network device and forward the multicast data only if a failure occurs at said primary designated router or forwarder; and
   memory for storing said outgoing interface list identifying receivers of the multicast data for the multicast group and wherein the receiver is identified in said outgoing interface list only if a failure occurs at said primary designated router or forwarder;
   wherein receiving an indication that a receiver wants to join a multicast group, transmitting the PIM join message, and receiving multicast data are performed when both said primary and secondary designated routers or forwarders are operating during normal operation at said primary designated router or forwarder.

10. The apparatus of claim 9 wherein the processor is configured to generate state information for the multicast group in response to receiving said indication that the receiver wants to join the multicast group.

11. The apparatus of claim 9 wherein the processor is configured to utilize a Bidirectional Protocol Independent Multicast protocol and the apparatus is designated as said secondary designated forwarder in an election process selecting said primary designated forwarder.

12. The apparatus of claim 9 wherein the processor is configured to utilize a Protocol Independent Multicast Sparse Mode protocol and the network device is designated as said secondary designated router in an election process selecting said primary designated router.

13. The apparatus of claim 9 wherein said received indication is an IGMP or MLD message.

14. The apparatus of claim 9 wherein the processor is configured to identify a failure at said primary designated router or forwarder and add the receiver to said list.

15. An apparatus comprising:
   means for receiving at a network device designated as a secondary designated router or forwarder in a Protocol Independent Multicast (PIM) distribution tree, an indication that a receiver wants to join a multicast group;
   means for transmitting a PIM join message upstream towards a source or a rendezvous point in said distribution tree, in response to said received indication;
   means for receiving multicast data from a source at the network device;
   means for dropping the multicast data if a primary designated router or forwarder is operating to forward said multicast data from the source to the receiver; and
   means for adding the receiver to an outgoing interface list at the network device and forwarding the multicast data to the receiver only if a failure occurs at said primary designated router or forwarder;

wherein said means for receiving an indication that a receiver wants to join a multicast group, said means for transmitting the PIM join message, and said means for receiving multicast data, are configured for operating when both said primary and secondary designated routers or forwarders are operating during normal operation at said primary designated router or forwarder.

16. The apparatus of claim 15 further comprising means for sending Hello messages at a faster rate than non-DR/DF neighbors.

17. The apparatus of claim 15 wherein means for receiving multicast data comprises means for receiving a multicast packet addressed to the multicast group, and means for dropping the multicast data comprises:
- means for checking said outgoing interface list; and
- means for preventing said received multicast packet from being forwarded via an interface leading towards the receiver if the interface is not identified in said outgoing interface list.

* * * * *